United States Patent
Aunkofer et al.

(10) Patent No.: US 8,653,955 B2
(45) Date of Patent: Feb. 18, 2014

(54) METHOD, DEVICE AND SYSTEM FOR EXCHANGING INFORMATION BETWEEN A VEHICLE AND A MOBILE ID PROVIDER

(75) Inventors: Markus Aunkofer, Abensberg (DE);
Herbert Froitzheim, Pettendorf (DE);
Christian Kursawe, Straubing (DE);
Thomas Reisinger, Regenstauf (DE);
Ingo Tschauschner, Lappersdorf (DE);
Roland Wagner, Kassel (DE)

(73) Assignee: Continental Automotive GmbH, Hannover (DE)

( * ) Notice: Subject to any disclaimer, the term of this patent is extended or adjusted under 35 U.S.C. 154(b) by 844 days.

(21) Appl. No.: 12/679,536

(22) PCT Filed: Sep. 18, 2008

(86) PCT No.: PCT/EP2008/062476
§ 371 (c)(1),
(2), (4) Date: Jun. 8, 2010

(87) PCT Pub. No.: WO2009/040296
PCT Pub. Date: Apr. 2, 2009

(65) Prior Publication Data
US 2010/0265047 A1    Oct. 21, 2010

(30) Foreign Application Priority Data
Sep. 24, 2007   (DE) .......................... 10 2007 045 712

(51) Int. Cl.
*B60R 25/10* (2013.01)
*H04Q 5/22* (2006.01)
(52) U.S. Cl.
USPC ............. 340/426.15; 340/426.1; 340/426.13; 340/10.1; 701/2; 307/10.1

(58) Field of Classification Search
USPC ............... 340/426.15, 426.18, 426.1, 426.13, 340/426.36, 10.1, 10.6, 13.1, 13.24, 426.11, 340/426.16, 5.72, 426.3, 425.5; 701/1, 2; 307/10.1, 10.2
See application file for complete search history.

(56) References Cited

U.S. PATENT DOCUMENTS 5,115,236 A    5/1992   Köhler ...................... 340/825.69
5,781,106 A    7/1998   Liger ............................ 340/505
(Continued)

FOREIGN PATENT DOCUMENTS

DE        3853132 T2    9/1995   ............. G08C 19/28
DE       69504083 T2    4/1999   ............. G08G 1/017
(Continued)

OTHER PUBLICATIONS

International PCT Search Report, PCT/EP2008/062476, 4 pages, Mailed Jan. 23, 2009.

*Primary Examiner* — Anh V La
(74) *Attorney, Agent, or Firm* — King & Spalding L.L.P.

(57) ABSTRACT

A method for exchanging information between a vehicle (1) and a mobile ID provider (11) has the following process steps: transmitting status request signals of the ID provider (11) to a communications device (21) in the vehicle having a prescribed period, wherein the periodically occurring action has the status request signal and a predefined pause, —activating the communications device (21) in the vehicle in case of alarm in a receiving mode, receiving the status request signal of the ID provider (11) by the activated communications device (21) in the vehicle, —transmitting an alarm message by the communications device (21) in the vehicle to the mobile ID provider (11); and display of the alarm signal on the ID provider (11). The method is particularly suited for the display of alarm messages of a vehicle on a mobile ID provider.

19 Claims, 2 Drawing Sheets

(56) References Cited

U.S. PATENT DOCUMENTS

| | | | | |
|---|---|---|---|---|
| 5,973,611 | A * | 10/1999 | Kulha et al. | 340/5.62 |
| 6,359,570 | B1 * | 3/2002 | Adcox et al. | 340/902 |
| 6,724,322 | B2 * | 4/2004 | Tang et al. | 340/989 |
| 7,167,083 | B2 * | 1/2007 | Giles | 340/426.15 |
| 7,292,137 | B2 | 11/2007 | Gilbert et al. | 340/426.3 |
| 7,394,349 | B2 | 7/2008 | Marek et al. | 340/425.5 |
| 2002/0067253 | A1 | 6/2002 | Trajkovic et al. | 340/506 |
| 2005/0134477 | A1 * | 6/2005 | Ghabra et al. | 340/825.72 |
| 2007/0171030 | A1 | 7/2007 | Kobayashi | 340/426.1 |

FOREIGN PATENT DOCUMENTS

| | | | |
|---|---|---|---|
| DE | 102004029837 A1 | 1/2006 | G08B 21/22 |
| DE | 102006016495 A1 | 11/2006 | B60R 25/00 |
| GB | 2299695 A | 10/1996 | B60R 25/00 |
| JP | 4207892 A | 7/1992 | H04Q 9/00 |

* cited by examiner

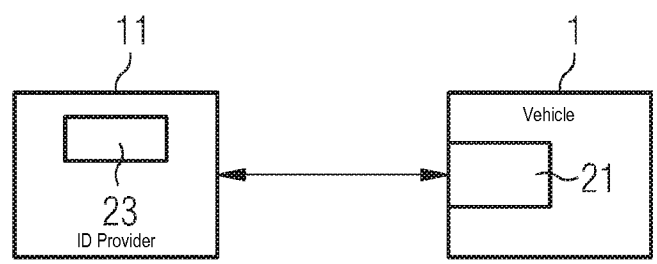

METHOD, DEVICE AND SYSTEM FOR EXCHANGING INFORMATION BETWEEN A VEHICLE AND A MOBILE ID PROVIDER

CROSS-REFERENCE TO RELATED APPLICATIONS

This application is a U.S. National Stage Application of International Application No. PCT/EP2008/062476 filed Sep. 18, 2008, which designates the United States of America, and claims priority to German Application No. 10 2007 045 712.1 filed Sep. 24, 2007, the contents of which are hereby incorporated by reference in their entirety.

TECHNICAL FIELD

The invention relates to a method, devices and a system for exchanging information between a vehicle and a mobile ID provider.

BACKGROUND

In automotive manufacture considerable attention is paid to driver safety requirements. One measure adopted in this regard resides in the use of bi-directional communication, for example by deploying high frequency signals (RF) to indicate to the driver any alarm or warning situation that may be emitted from the vehicle on a mobile RF transmitter/receiver device, e.g. vehicle key, the latter also being designated as a mobile identification (ID) provider.

Past solution strategies have stipulated that the vehicle must be actively transmitting and the key must always be on stand-by to receive, i.e. in so-called "polling" mode. As regards the key, the basic problem as far as this function is concerned is that of power/energy consumption. Even though the vehicle is actively transmitting and the key is only in receiving mode and average current consumption is reduced by approx. $1/10$th to $1/50$th of the active current for the receiver, there is still a not inconsiderable degree of energy consumption. Activation of the alarming function on the key is, with established battery technologies (small battery dimensions), only possible for a few days before it becomes necessary to change or to charge a battery.

In addition, certain problems emerge in the event of an alarm due to the actively transmitting vehicle which, during transmission, will be unable to receive any commands or information from associated vehicle keys or other ID providers.

The above problems are so far unresolved. Known alarming systems universally utilize polling technology. As a rule battery/rechargeable battery concepts are used which call for frequent recharging.

SUMMARY

According to various embodiments, a technical solution can be put forward that will enable, by comparison to the prior art, an improved level of energy efficiency for a mobile ID provider operated in conjunction with the exchange of data with a vehicle.

According to an embodiment, a method for exchanging information between a vehicle and a mobile ID provider consisting of the following method steps: —transmission of status request signals of the ID provider to a communications device in the vehicle with a specific cycle, the periodically occurring event being made up of the status request signal and a pre-defined pause, —activation of the communications device in the vehicle in a reception mode in the event of an alarm, —reception of the status request signals of the ID provider by the activated communications device in the vehicle, —transmission of an alarm message by the communications device in the vehicle to the mobile ID provider; and —display of the alarm signal on the ID provider.

According to a further embodiment, the periodic transmission of the status request signals may commence following locking of the vehicle. According to a further embodiment, the cycle for transmitting the status request signals can be shortest directly after locking the vehicle and may become longer as time progresses. According to a further embodiment, transmission of the status request signals can be de-activated after a predetermined period following locking of the vehicle. According to a further embodiment, a reception interrogation signal can be transmitted to the communications device in the vehicle at the same time as the status request signals and the communications device in the vehicle subsequently may transmit a signal of confirmation directly to the ID provider. According to a further embodiment, the reception interrogation signal can only be transmitted simultaneously with each nth status request signal, wherein $n>=2$. According to a further embodiment, transmission of the status request signals can be activated as soon as the ID provider receives a signal of confirmation by way of response to a reception interrogation signal, which means that the ID provider is within the reception area of the communications device in the vehicle. According to a further embodiment, transmission of the status request signals can be deactivated if the ID provider does not receive a signal of confirmation by way of response to a reception interrogation signal, which means that the ID provider is outside the reception area of the communications device in the vehicle. According to a further embodiment, transmission of the status request signals may take place depending upon the measured values of a movement sensor integrated in the ID provider. According to a further embodiment, transmission of the status request signals can be deactivated after a predetermined period in which no movements have been detected by the movement sensor. According to a further embodiment, transmission of the status request signals may resume immediately on detection of a movement by the movement sensor. According to a further embodiment, the duration of transmission of the status request signals does not exceed a maximum of 1% within a defined period of time. According to a further embodiment, transmission of the status request signals can be manually activated or deactivated.

According to another embodiment, an ID provider for transmitting status request signals to an associated vehicle may comprise: —means for periodic transmission of status request signals in a predetermined cycle, the periodically occurring event being made up of the status request signal and a pre-defined pause; —means for receiving an alarm message from a vehicle; and —output device for displaying the alarm message from the vehicle to a user.

According to yet another embodiment, a communications device in the vehicle may comprise—an activating device for activating an in-vehicle receiver in a reception mode in the event of an alarm; —an in-vehicle receiver for receiving a status request signal; and—an in-vehicle transmitter for transmitting an alarm message in reception mode depending upon receipt of the status request signal.

According to another embodiment, a system for the exchange of information between a vehicle and a mobile ID provider may have a mobile ID provider as described above and a communications device in the vehicle as described above.

BRIEF DESCRIPTION OF THE DRAWINGS

In this the following are shown in diagrammatic form:

FIG. 2 a device for exchanging information between an ID provider and a vehicle.

In the following description of a preferred embodiment, identical or comparable components are designated by identical reference numbers.

DETAILED DESCRIPTION

Figure 1:
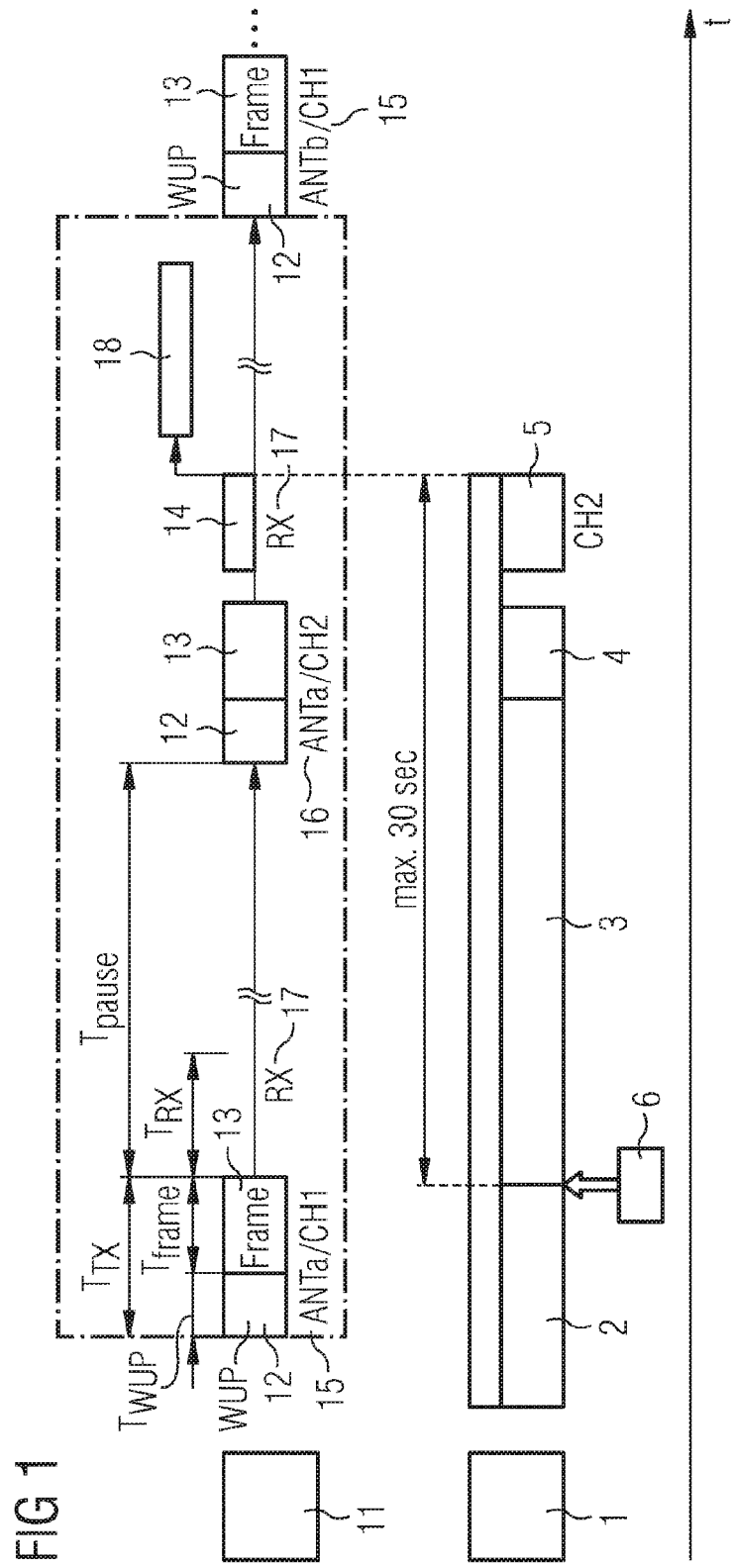
FIG. 1 a chronological sequence of signals transmitted and received.

According to various embodiments, a method is proposed for the exchange of information between a vehicle and a mobile ID provider and may comprise the following method steps:

Transmission of status request signals of the ID provider to a communications device in the vehicle in a predetermined cycle, wherein the periodically occurring event is made up of the status request signal and a pre-defined pause, Activation in a receiving mode of the communication device in the vehicle in the event of an alarm, Reception of the status request signals of the ID provider by the activated communications device in the vehicle, Transmission of an alarm signal by the communications device in the vehicle to the mobile ID provider; and Display of the alarm signal on the ID provider.

The method enables a periodic transmission of status requests from the ID provider to the vehicle, the status request signals being followed by energy-saving pauses of defined duration. With identical boundary conditions, such as identical reaction time, this has the advantage that the energy requirement necessary for transmitting the automatic status requests is considerably less, advantageously by approx. one to the power of ten, than the continuous reception status of the ID provider known hitherto.

Expediently, the periodic transmission of the status request signals commences once the vehicle has been locked.

It has been proved that the cycle for transmitting the status request signals is at its shortest immediately after locking the vehicle and becomes longer with time, transmission of the status request signals being deactivated after a predetermined period following locking of the vehicle.

In an embodiment, a reception request signal is transmitted to the communications device in the vehicle at the same time as the status request signals and the communications device in the vehicle then transmits a confirmation signal directly to the ID provider.

Expediently, the reception request signal is only transmitted simultaneously with the nth status request signal, wherein n>=2.

In a further embodiment, transmission of the status request signals is activated as soon as the ID provider receives a signal of confirmation by way of response to a reception request signal, which signifies that the ID provider is within the reception range of the communications device in the vehicle.

Analogous to this, it is expedient that the transmission of the status request signals should be deactivated if the ID provider does not receive a confirmation signal by way of response to a reception request signal, which signifies that the ID provider is outside the reception area for the communications device in the vehicle.

In a further embodiment, transmission of the status request signals takes place depending upon the measured values of a movement sensor integrated in the ID provider.

Furthermore, it is expedient that the transmission of the status request signals should be deactivated after a predetermined period in which no movements have been detected by the movement sensor.

Similarly, transmission of the status request signals is resumed immediately as soon as the movement sensor detects a movement.

It has proved worthwhile to ensure that the duration of transmission of the status request signals does not exceed a maximum of 1% within a defined period of time.

Transmission of the status request signals may be manually activated or deactivated, whichever is expedient.

According to other embodiments, an ID provider for the transmission of status request signals to an allocated vehicle is proposed with the following means:

means for the periodic transmission of status request signals in a predetermined cycle, wherein the periodically occurring event is made up of the status request signal and a pre-defined pause;

means for receiving an alarm signal from a vehicle; and output device for the display of the alarm signal from the vehicle to a user.

According to yet other embodiments, a communications device in the vehicle may comprise:

activating device for activating a receiver in the vehicle in a receiving mode in the event of an alarm;

receiver in the vehicle for receiving a status request signal; and transmitter in the vehicle for transmitting an alarm signal in the receiving mode depending upon the reception of the status request signal.

According to yet other embodiments, a system for exchanging information between a vehicle and/or the associated communications device in the vehicle and a mobile ID provider is proposed.

Further details and advantages of the various embodiments are defined by reference to the attached figures.

In this, FIG. 1 shows, in diagrammatic form, the chronological sequence in time direction t of signals transmitted and received by a vehicle 1 and an ID provider 11. As regards vehicle 1 and ID provider 11, the time phases shown parallel to time axis t emerge. For the exchange of signals between ID provider 11 and vehicle 1, it is assumed that the vehicle is within signal range of ID provider 11. The transmission time period $T_{TX}$ for ID provider 11 is followed by a reception time period $T_{RX}$, in which a potential alarm signal from the vehicle is received. In the present example no alarm signal from vehicle 1 is present during transmission time period $T_{TX}$ of ID provider 11 and vehicle 1 receives the status request signal from ID provider 11 but does not process this further. Hence ID provider 11 does not receive any signal from vehicle 1 during reception time period $T_{RX}$. As regards ID provider 11, this reception time period $T_{RX}$ is followed by a period of time $T_{Pause}$ in which there is no exchange of signal with the vehicle. On termination of pause period $T_{Pause}$ the cycle starts from the beginning. In the $T_{Pause}$ pause period of ID provider 11, vehicle access function Rx 17 continues to be active.

Alarm signal 6 in vehicle 1 now serves to ensure that ID provider 11 receives an alarm signal in the next cycle. During transmission time period $T_{TX}$, a wake-up sequence 12 (also designated Wake-up Pattern WUP) as a transmitter signal as well as a detection protocol 13 are transmitted, the latter also being described as a frame. The corresponding time windows $T_{WUP}$ and $T_{Frame}$ respectively are provided for this. The process of transmission from ID provider 11 to vehicle 1 is also known by the term Uplink. These automatic status requests are primarily intended to check whether an alarm situation is present or not. Normally the intention with Uplink is that, prior to the actual telegram, a wake-up sequence 12 is transmitted in order to wake the receiver in vehicle 1, which receiver is normally in polling mode. It is only when a wake-up sequence 12 is transmitted that vehicle 1 will normally be able to reliably detect a status request from ID provider 11. Since detection of the automatic status request is essential only in an alarm situation, transmission of wake-up sequence 12 may be omitted if it may be assumed that vehicle 1 is permanently in receive mode in an alarm situation. Where applicable, a brief wake-up sequence 12 may be transmitted if the receiver in the vehicle is also required to scan various channels and/or antennas 15, 16 in permanent mode. The automatic status request will therefore not normally be detected by the vehicle, nor will there be any response to it. Transmission time period $T_{TX}$ of ID provider 11 is followed by a reception time period $T_{TX}$ in which a potential alarm signal from the vehicle may be received. This reception time period $T_{RX}$ is followed by a period where there is no exchange of signals ($T_{pause}$) with the vehicle on the part of ID provider 11. On termination of the pause time period $T_{pause}$ the cycle starts from the beginning. In the pause time period $T_{pause}$ of ID provider 11, function Rx 17, which is critical for access to the vehicle, continues to be active.

At the point when an alarm situation 6 occurs on vehicle 1, the receiver in vehicle 1 changes from polling mode 2 into an active mode 3, i.e. it remains permanently in receive mode. Where appropriate, channels and antennas 15, 16 may be continuously scanned. As a result vehicle 1 can now reliably detect the automatic status requests of ID provider 11 and can communicate the alarm situation in its response, the status feedback signal. The process of transmission from ID provider 11 to vehicle 1 is also known by the term Uplink. The receiver in the vehicle is now in receive mode and can receive the status request with detection protocol 13 (in the ID provider) and 4 (in the vehicle). The detection protocol 4 received is processed in vehicle 1 and an alarm signal 5 derived from it is transmitted to ID provider 11. ID provider 11 assesses the status feedback signal 14 or alarm signal 5 received from vehicle 1 and is able to alert the user to the alarm by means of an optical and/or acoustic and/or mechanical vibration/message 18.

The cycle duration of the automatic status requests is typically 30 seconds, representing the maximum reaction time in which a vehicle alarm will be indicated on ID provider 11 located within the reception range.

The use of multichannel methods and multiple antennas, known as antenna diversity, leads to a transmission that is more robust against interference and antenna null points through destructive interference of the transmitted signals. One transparent implementation resides in rearranging the possible antenna combinations for channel and ID provider at each automatic status request.

A further aspect has emerged as far as the European market is concerned: here, because of licensing conditions (EN 300 22) the duration of transmission must be limited by regulating the duty-cycle e.g. to 1% in an hour in the 868.0-868.6 MHz band. This results in forced transmission pauses which will ultimately become definitive as far as reaction time is concerned.

The method presented now offers the possibility of guaranteeing shorter reaction times than with standard procedures featuring receiver polling at the key, whilst maintaining the same level of energy consumption by the key.

Because the status requests need practically no or only one very short wake-up sequence 12, the duration of transmission for a request is relatively brief. Hence the requests can be transmitted at short intervals. As regards methods with receiver polling, the vehicle must, in the event of an alarm, transmit relatively long wake-up sequences 12 in order to keep energy consumption in the key to some extent within limits. Therefore allowance must be made for longer pauses between the alarm telegrams that the vehicle transmits, with the result that the reaction time becomes greater.

Moreover, the method presented offers the user the possibility of adjusting cycle duration and/or the desired reaction time himself. This means that an individual user decision is possible on how the compromise between reaction time and battery charging cycle is to be structured. These adjustments can be made individually at the key—including outside the reception area—and do not require any re-configuration of parameters in relation to the vehicle. Likewise, the user can specifically activate or deactivate the alarm function on ID provider 11. Specific activation may, for example, be expedient if the user only desires the alarm function when he is going to his vehicle 1. Specific deactivation will then be necessary e.g. if the user goes into areas where the operation of radio transmitters is prohibited, for instance on board aircraft.

In an extension to the method, the functionality of reception area detection (also known as "out-of-range detection") can be illustrated without major additional expenditure. For this, every nth automatic status request (n~10) is transmitted with a wake-up sequence 12, i.e. this "extended" automatic status request is reliably detected and answered by vehicle 1, subject to ID provider 11 being within the reception area of vehicle 1. Therefore, if ID provider 11 receives status feedback from vehicle 1, it knows implicitly that it is still/once more in the reception area. Conversely, in the absence of any status feedback, ID provider 11 must assume that it has left the reception area.

The information "inside/outside the reception area" can be displayed to the user, but it can also be used to further optimize the algorithm for automatic status requests, e.g. in order to extend the cycle duration for the automatic status requests on leaving the reception area and thus save energy.

The method according to various embodiments makes automatic and cyclical transmission of status requests from ID provider 11 to vehicle 1 possible. Where boundary conditions are identical (such as identical reaction time) this has the advantage that the energy necessary for transmitting the automatic status requests is considerably less, advantageously by approx. one to the power of ten, than is the case with the receiver polling with which we are already familiar. The service life of the battery/potential activation time is therefore extended correspondingly without recharging the battery. In addition, individual configuration by the user of function parameter activation, de-activation, reaction time and energy consumption is made possible at the key.

A further advantage lies in the fact that, in the event of an alarm, vehicle 1 changes from polling mode into active mode if wake-up sequence 12 is not transmitted. Hence a further reduction in energy requirement is achieved of the order of one third of energy consumed. In addition, short reaction times can be realized.

One possible way of increasing transmission reliability consists in deploying several antennas and transmission channels in the vehicle. The potential may be further utilized by rearranging the possible antenna and channel combinations with each automatic status request. At the same time, there is no increase in energy consumption in the key. Even the reaction time will remain the same under normal circumstances i.e. subject to absence of interference and the availability of good reception. It is only where reception conditions are poor or in the event of interference that the reaction time will increase until a functioning antenna/channel combination is deployed during transmission. With N possible combinations, there will be a statistical N/2-fold increase in reaction time.

It is also possible to adjust the cycle duration in which the status request signal is transmitted to correspond to the actual conditions. Such conditions may be based on the operation of vehicle functions, e.g. locking, over a period of time by successively extending the cycle time, on receipt of information from a movement sensor or on the status of connections with the vehicle, whether inside or outside the reception area. For example, a short duration cycle after locking the vehicle is conceivable for a particular time interval, e.g. 10 minutes. This means that, within this shorter time interval, polling will take place more often. Thus a shorter reaction time is achieved if the vehicle is left only briefly. Furthermore, the cycle duration can be extended successively in defined time intervals and ultimately automatically de-activated after a longer period of time. In another embodiment, control of cycle duration or activation/de-activation may be initiated by means of a movement sensor integrated in the key. Advantageously, energy consumption and also the reaction time are optimized by implementing these measures.

By interspersing status requests with wake-up sequences 12 a representation of reception area detection can be obtained.

FIG. 2 shows an ID provider 11 which transmits signals in accordance with the sequence diagram described above to a communications device 21 in a vehicle 1 or receives information from communications device 21 in vehicle 1. Communications device 21 comprises a transmitter 22, a receiver 23 and an activation device 24. ID provider 11 also shows an output device 24 for displaying the alarm message transmitted by the communications device 21 in the vehicle. The output device 25 may be designed as a visual display or also for emitting acoustic signals.

The present invention is particularly suitable for displaying alarm messages from a vehicle 1 to a mobile ID provider 11.

What is claimed is:

1. A method for exchanging information between a vehicle and a mobile ID provider consisting of the following method steps:
transmitting status request signals from the ID provider to a communications device in the vehicle with a cycle period, the cycle period including one status request signal and an inactive period of time,
sensing an alarm situation at the vehicle,
activating the communications device in the vehicle in a reception mode in response to sensing the alarm situation,
receiving one of the status request signals from the ID provider at the activated communications device in the vehicle,
transmitting an alarm message from the communications device in the vehicle to the mobile ID provider; and
displaying an alarm signal on the ID provider corresponding to the alarm message transmitted from the communications device in the vehicle.

2. The method according to claim 1, wherein the step of transmitting status request signals commences following locking of the vehicle.

3. The method according to claim 1, wherein the cycle period for transmitting the status request signals is shortest directly after locking the vehicle and becomes longer as time progresses.

4. The method according to claim 1, wherein the step of transmitting status request signals stops after a predetermined period following locking of the vehicle.

5. The method according to claim 1, wherein the step of transmitting status request signals includes transmitting a reception interrogation signal to the communications device in the vehicle and wherein the communications device in the vehicle subsequently transmits a signal of confirmation directly to the ID provider.

6. The method according to claim 5, wherein the reception interrogation signal is only transmitted simultaneously with each nth status request signal, wherein n>=2.

7. The method according to claim 5, wherein the step of transmitting status request signals is activated as soon as the ID provider receives a signal of confirmation by way of response to a reception interrogation signal, which means that the ID provider is within the reception area of the communications device in the vehicle.

8. The method according to claim 5, wherein the step of transmitting status request signals is de-activated if the ID provider does not receive a signal of confirmation by way of response to a reception interrogation signal, which means that the ID provider is outside the reception area of the communications device in the vehicle.

9. The method according to claim 1, wherein the step of transmitting status request signals takes place depending upon the measured values of a movement sensor integrated in the ID provider.

10. The method according to claim 9, wherein the step of transmitting status request signals is de-activated after a predetermined period in which no movements have been detected by the movement sensor.

11. The method according to claim 10, wherein the step of transmitting status request signals resumes immediately on detection of a movement by the movement sensor.

12. The method according to claim 1, wherein the duration of transmission of the status request signals does not exceed a maximum of 1% of the inactive period of time.

13. The method according to claim 1, wherein the step of transmitting status request signals can be manually activated or de-activated.

14. A communications device in the vehicle comprising:
an activating device for activating an in-vehicle receiver in a reception mode in the event an alarm situation is sensed at the vehicle;
the in-vehicle receiver for receiving a status request signal once activated by the activating device; and
an in-vehicle transmitter for transmitting an alarm message in reception mode depending upon receipt of the status request signal.

15. A system for the exchange of information between a vehicle and a mobile ID provider comprising:
an activating device for activating an in-vehicle receiver in a reception mode in the event an alarm situation is sensed at the vehicle;
the in-vehicle receiver for receiving a status request signal once activated by the activating device;
an in-vehicle transmitter for transmitting an alarm message in reception mode depending upon receipt of the status request signal; and
the mobile ID provider comprising:
means for periodic transmission of status request signals with a cycle period, the cycle period including one status request signal and an inactive period of time;
means for receiving an alarm message from the vehicle; and an output device for displaying the alarm message from the vehicle to a user.

16. The system according to claim 15, wherein the mobile ID provider begins transmitting the status request signals following locking of the vehicle.

17. The system according to claim 15, wherein the cycle period for transmitting the status request signals is shortest directly after locking the vehicle and becomes longer as time progresses.

18. The system according to claim 15, wherein the system is operable to de-activate transmission of the status request signals after a predetermined period following locking of the vehicle.

19. The system according to claim 15, wherein the system is operable to transmit a reception interrogation signal to the communications device in the vehicle at the same time as the status request signals and the communications device in the vehicle subsequently transmits a signal of confirmation directly to the ID provider.

\* \* \* \* \*